(12) United States Patent
Cheikh et al.

(10) Patent No.: US 9,553,472 B2
(45) Date of Patent: Jan. 24, 2017

(54) METHOD AND CHARGING BENCH VIA MAGNETIC COUPLING

(71) Applicants: CONTINENTAL AUTOMOTIVE FRANCE, Toulouse (FR); CONTINENTAL AUTOMOTIVE GmbH, Hannover (DE)

(72) Inventors: Mohamed Cheikh, Toulouse (FR); Youri Vassilieff, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 585 days.

(21) Appl. No.: 13/860,723

(22) Filed: Apr. 11, 2013

(65) Prior Publication Data
US 2013/0271071 A1 Oct. 17, 2013

(30) Foreign Application Priority Data

Apr. 12, 2012 (FR) ...................... 12 53357

(51) Int. Cl.
*H02J 7/00* (2006.01)
*H02J 7/14* (2006.01)
(Continued)

(52) U.S. Cl.
CPC ............ *H02J 7/025* (2013.01); *H01F 38/14* (2013.01); *H02J 5/005* (2013.01); *H01F 27/365* (2013.01); *H02J 7/00* (2013.01); *H02J 7/0027* (2013.01)

(58) Field of Classification Search
USPC ....... 320/108, 107, 109, 114, 137, 106, 132, 320/162; 340/10.4; 307/104
See application file for complete search history.

(56) References Cited

U.S. PATENT DOCUMENTS 5,959,433 A * 9/1999 Rohde ........................... 320/108
6,906,495 B2 * 6/2005 Cheng et al. .................. 320/108
(Continued)

FOREIGN PATENT DOCUMENTS

CN 101147308 3/2008
CN 101529691 9/2009
(Continued)

OTHER PUBLICATIONS

French Search Report dated Jan. 15, 2013, corresponding to the Foreign Priority Application No. 1253357.

*Primary Examiner* — Alexis A Boateng
(74) *Attorney, Agent, or Firm* — Young & Thompson

(57) ABSTRACT

A charging bench includes three coils that partially overlap, in superposed planes. An electrical feed makes it possible to supply the coils with an AC current from the mains. A portable device to be charged is placed on the upper side of this charging bench. This device includes a winding intended to receive the electrical charging, and a ferrite protective screen. One of the coils (Bb) is selected to emit the magnetic charging flux toward the mobile phone. The selection is carried out via the emission of a series of pulses by at least one of the coils and comparison of return signals with a reference threshold. This comparison also enables one of the other coils (Ba, Bc) to be selected or both of these other two coils (Ba, Bc) to be used to receive a flux for communicating information originating from the portable device to be charged.

18 Claims, 4 Drawing Sheets

(51) Int. Cl.
*H02J 7/02* (2016.01)
*H01F 38/14* (2006.01)
*H02J 5/00* (2016.01)
*H01F 27/36* (2006.01)

(56) References Cited

U.S. PATENT DOCUMENTS

| | | | |
|---|---|---|---|
| 8,305,036 B2* | 11/2012 | Toya et al. | 320/108 |
| 8,525,688 B2* | 9/2013 | Chatterjee et al. | 340/686.1 |
| 8,917,057 B2* | 12/2014 | Hui | 320/108 |
| 2005/0068009 A1 | 3/2005 | Aoki | |
| 2008/0258679 A1* | 10/2008 | Manico et al. | 320/106 |
| 2009/0096413 A1* | 4/2009 | Partovi et al. | 320/108 |
| 2009/0261778 A1 | 10/2009 | Kook | |
| 2010/0066305 A1 | 3/2010 | Takahashi et al. | |
| 2010/0244579 A1 | 9/2010 | Sogabe et al. | |
| 2010/0259217 A1 | 10/2010 | Baarman et al. | |
| 2010/0279606 A1 | 11/2010 | Hillan et al. | |
| 2010/0289450 A1 | 11/2010 | Kook | |
| 2010/0315039 A1* | 12/2010 | Terao | H02J 7/025 320/108 |
| 2010/0328044 A1* | 12/2010 | Waffenschmidt | H02J 7/025 340/10.4 |
| 2011/0025265 A1 | 2/2011 | Mochids et al. | |
| 2011/0285348 A1 | 11/2011 | Hong | |
| 2012/0049791 A1 | 3/2012 | Tanabe | |
| 2012/0286724 A1* | 11/2012 | Tsai et al. | 320/108 |
| 2013/0169224 A1 | 7/2013 | Terao et al. | |
| 2014/0327397 A1* | 11/2014 | Houivet et al. | 320/108 |

FOREIGN PATENT DOCUMENTS

| | | |
|---|---|---|
| CN | 101924400 | 12/2010 |
| CN | 102318216 | 1/2012 |
| EP | 2 256 895 | 12/2010 |
| JP | 2012055045 | 3/2012 |

* cited by examiner

METHOD AND CHARGING BENCH VIA MAGNETIC COUPLING

FIELD OF THE INVENTION

The invention relates to a method for charging by magnetic coupling comprising the functions of electrical charging and of communicating information originating from a portable device in order to control the charging. The invention also relates to a charging bench able to implement such a method.

The field of the invention is that of inductive charging by an optionally portable device, referred to as the "primary" device, which device is used to charge or recharge one or more portable electronic devices, for example mobile phones, USB keys, MP3 players, smartphones, GPS devices, etc., which devices are collectively referred to as the "secondary" device.

BACKGROUND OF THE INVENTION

Primary inductive charging devices are recent developments. The use of inductive charging is becoming more widespread, since, because there is no need for a specific connection interface, it enables wireless charging and can be adapted to many applications including, in particular, a "charging bench" surface which is used to simultaneously recharge a number of portable devices. Furthermore, it enables charging to be combined with a billing function for billing for the electrical power supplied. Inductive charging is becoming a universal charging standard.

Inductive charging makes use of the electrical phenomena of magnetic coupling between two windings, that of the primary device and that of the secondary device, which enables the electromagnetic transfer of voltage. An AC current in the winding of the primary device produces a variable magnetic field, the field lines of which transect the winding of the secondary device. This transection of the secondary winding by field lines of varying intensity induces a current in this winding. The voltage created by this current can then be used to power the secondary device or to charge its battery. The efficiency of the transfer depends on the quality of the coupling between the two windings.

Inductive charging requires a communication function that is specific to it, in order to control charging based on reception, by the primary device, of information relating to the charge level, the charging rate, or the bill for the power supplied. The primary device then processes the information in order to deduce therefrom possible actions to take: stopping of the charging, whether completely or temporarily, triggering of a billing process, etc.

Many ways of improving inductive charging have been provided recently, such as those published in patent documents U.S. 2010/0066305, U.S. 2011/0025265 or U.S. 2011/0285348.

Document U.S. 2010/0066305 in particular describes various operations that must be carried out in order to charge a secondary device, especially: placing the winding of the secondary device opposite that of the primary device; providing control and contactless communication functions in order to monitor charging of the secondary device; and stopping the charging once it is complete. One of the drawbacks of this type of device lies in the need to stop the charging in order to carry out the indispensible steps of communication and in order, in particular, to verify the charge level of the secondary device. The charging is interrupted so that the communication can be transmitted without interference or parasitic noise.

Document U.S. 2011/0025265 describes a primary device equipped, in addition to the winding provided for the electrical charging, with a second antenna for proximity wireless communication with the secondary device, and a secondary device also equipped with a second antenna. This second antenna is mainly dedicated to communication between the primary device and the secondary device. Nevertheless, during the communication phase, the charging is stopped, otherwise this charging interferes with the communication via harmonic noise. In addition, the constraint imposed on the secondary device, namely the use of a specific second antenna, deprives the wireless charger of its universal nature.

As for document U.S. 2011/0285348, it relates to improvements to the manufacture of the winding of the secondary device; it is formed by molding in one of the constituent layers of the secondary device. A winding molded in this way has two advantages: durability and thinness.

However, these devices do not enable, in good conditions, charging of the secondary device by the primary device simultaneously with communication between these two devices. Such simultaneity allows the charge level to be monitored in real time and the power emission to be decreased or stopped as soon as the secondary device signals that it is fully charged.

In these prior-art devices, the charging flux and the communication flux combine together as an amplitude modulation. The modulation index, which expresses the ratio of the amplitude of the information to the amplitude of the carrier, remains extremely small, about 1%, because the emitting antennas exhibit strong resonance, in order to increase their quality factor, and continuous emission. This small modulation index makes decoding the communication difficult and uncertain. In addition, the communication interferes with the charging flux, decreasing resonance between the two windings and therefore decreasing the efficiency of the transmission of energy between them.

SUMMARY OF THE INVENTION

The invention aims to overcome these drawbacks by separating the two types of flux for the portable device to be charged, i.e. the inductive charging magnetic flux and the communication flux concerning this charging, via reversible switching of coils between charging and communication modes.

More precisely, the present invention relates to a method for charging via magnetic coupling performing the functions of electrical charging of a portable electronic device to be charged, called the secondary device, by a charging device or bench, called the primary device, comprising at least two coils, and of communicating information originating from the secondary device to the primary device. In this method, the secondary device is detected then located via the emission of a test signal by at least one coil of the primary device, and the reception, in return, of a signal carrying information data by at least one coil of the primary device. The amplitude of the signal or signals received are then compared to at least one reference threshold in order to determine, in a selection phase, the coil of the primary device closest to the secondary device to switch into a charging mode, and the coil of the primary device, located proximate this charging coil, to switch into a mode for communicating information data so as to actuate instructions contained in these data.

Thus this method decouples the charging flux and the communication flux over at least two coils of the primary device, thereby making it possible for the secondary device to transmit instructions to the charger during charging without the charging interfering with this communication. The index of the amplitude modulation is greatly increased, becoming about 25%.

According to preferred embodiments:
- the energy transmission is achieved via inductive coupling between coils of the primary device and at least one coil of the secondary device under magnetic resonance conditions;
- the coils of the primary charging device are electrically out of phase;
- the test signal consists of a series of brief pulses emitted by a smaller number of coils regularly distributed in the array of coils of the primary device;
- the information data are analyzed in order to actuate the corresponding instructions: variation of the charging rate, stopping of the charging and/or billing for the cost of the charging;
- a test signal is emitted at regular intervals during charging in order to verify the amplitude of the return signal such as received by the coils, and to switch the operating mode of the coils depending on a new location of the secondary device when the amplitude of the signal received by the charging coil is below the reference threshold; and
- when a plurality of secondary devices to be charged are present, the operations of detection, location, and charge/communication selection are carried out for each secondary device.

The invention also relates to a charging bench able to implement this method. Such a charging bench comprises means for supplying electrical power, a surface for holding portable devices (secondary devices) to be charged, an array of coils consisting of at least two coils, at least one microcontroller for processing information data originating from at least one device to be charged (secondary device), at least one charging regulator, and mode selecting means connected, for each coil, to the microcontroller and the regulator in a circuit.

According to certain preferred embodiments:
- the mode selecting means consist in a multipath communication selector, the output of which is connected to one end of each coil and the input of which is connected to the microcontroller in order to provide it with information data, and in a multipath charging selector, the output of which is connected to the other end of each coil and the input of which is connected to the charging regulator in order to enable emission of a flux of electrical energy;
- the coils are at least three in number and arranged in at least two superposed planes that partially overlap one another; preferably, the coils are arranged such that there is partial overlap at least between two neighboring coils;
- the coils are mounted in an arrangement chosen from an arrangement in a line or network, especially a matrix, or spiral or circle.

BRIEF DESCRIPTION OF THE DRAWINGS

Other particulars, features and advantages of the present invention will become apparent on reading the following nonlimiting description, given with reference to the appended figures, which respectively show.

DETAILED DESCRIPTION OF THE INVENTION

Figure 1:
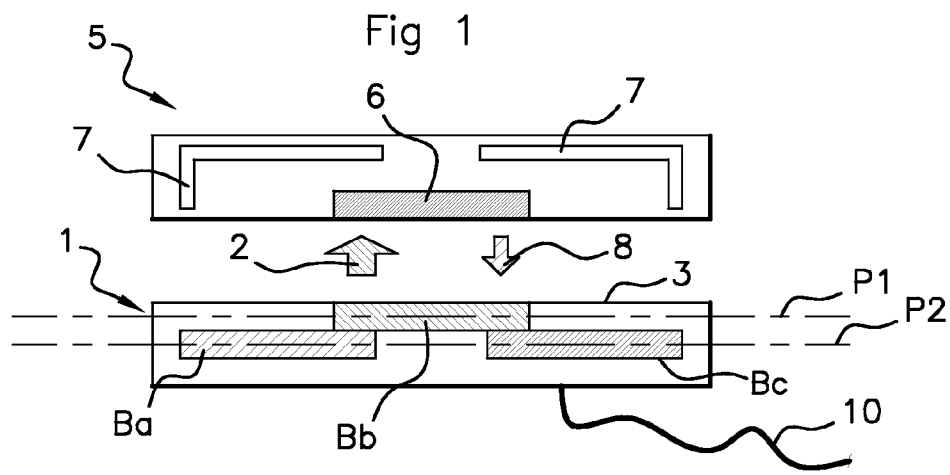
FIG. 1, a schematic cross-sectional view of an exemplary charging bench operating according to the principle of the invention and comprising three coils, a portable device to be charged being placed opposite.

The schematic view in FIG. 1 illustrates a cross section through a charging bench 1 (primary device) comprising three coils Ba, Bb and Bc that partially overlap, the central coil Bb being placed in an upper plane P1—i.e. closer the devices to be charged—located above that P2 of the two other end coils, Ba and Bc. An electrical feed 10 makes it possible to supply the coils with an AC current from the mains.

A portable device 5 to be charged (the secondary device 5) and more particularly a mobile phone 5 in the example, is placed on the upper side 3 of this charging bench (the mobile phone 5 is shown a distance from the bench for the sake of clarity). Such a mobile phone 5 comprises a winding 6 intended to receive the electrical charging, and a ferrite protective screen 7 for protecting its electronics from the surrounding magnetic fields.

Figure 4:
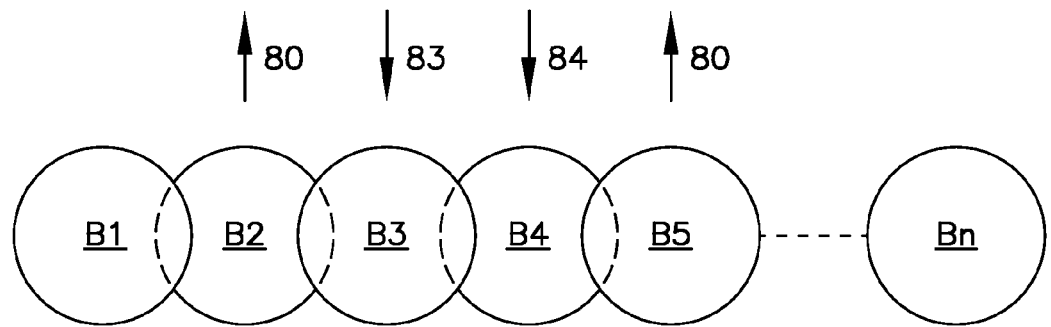
FIG. 4, a diagram of a linear array of charging coils for a charging bench during a phase of detecting and locating a device to be charged.

One of the coils, the coil Bb in the illustrated example, is selected to emit the magnetic charging flux 2 toward the mobile phone 5. The selection is carried out, according to the invention, via emission of a series of pulses by one of the coils and comparison of return signals with a reference threshold (see below, with reference to FIG. 4, the method of selecting "n" coils). One of the neighboring coils of the charging coil Bb, and which therefore is not used to transmit the charging flux 2—for example the coil Bc—is then used to receive a flux 8 communicating information 8 originating from the secondary device 5, i.e. the mobile phone 5.

Figure 2A:
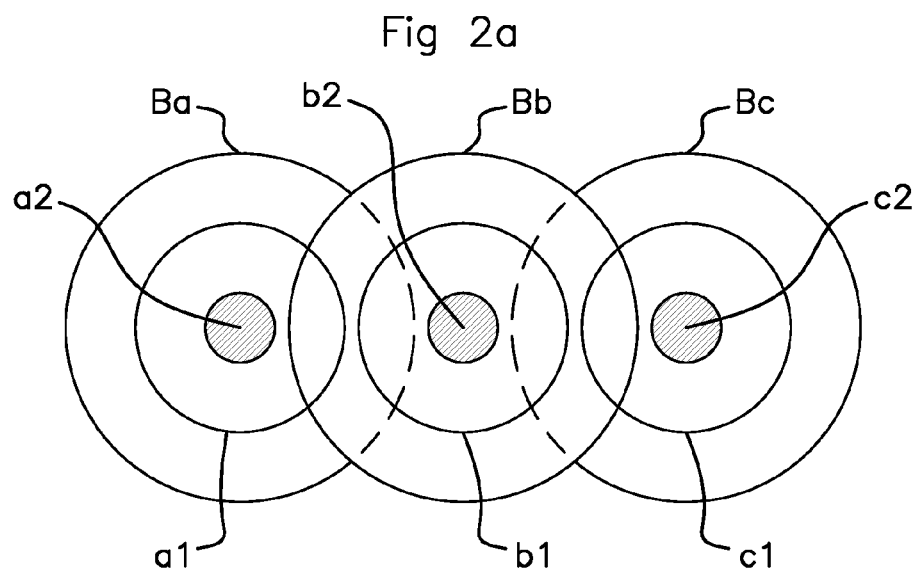
FIGS. 2a and 2b, a top view of the three coils in the exemplary charging bench according to FIG. 1 showing communication and charging zones when no portable device is in place and when such a device is placed on the charging appliance, respectively.

The overlap of the coils advantageously allows, as illustrated by the top view of the charging bench 1 in FIG. 2a, a continuous charging coverage to be obtained: the potential regions of charging a1, b1 and c1 of the coils Ba, Bb and Bc, respectively, overlap. In addition, this partial overlap reduces the magnetic coupling that disrupts the flux. In order to further reduce this coupling, for example to below 1.5%, the electrical supplies of each coil are advantageously shifted out of phase by a suitable phase shifter circuit known to a person skilled in the art.

Figure 2B:
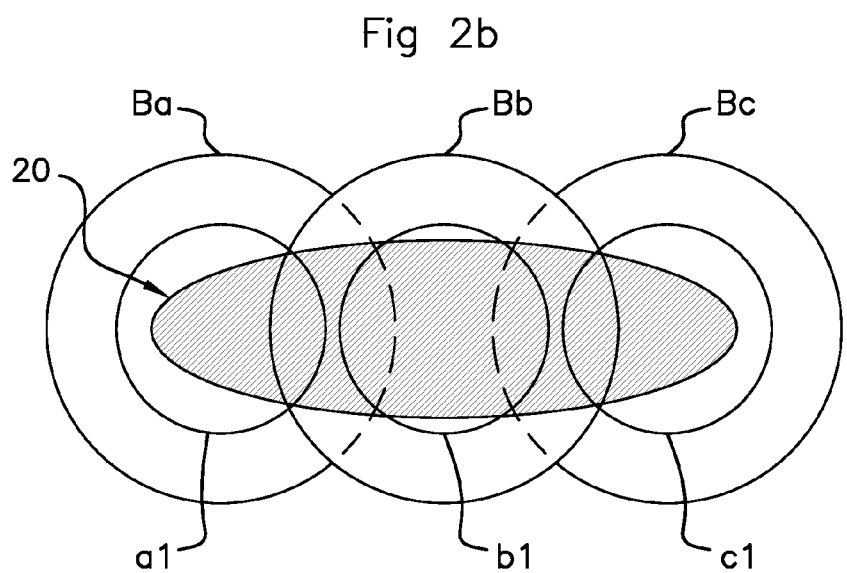

When no device is present on the charging bench 1, the communication zones a2, b2 and c2 of each of the coils Ba, Bb and Bc, are smaller than the charging zones a1, b1 and c1. When a secondary device 5 is placed on the charging bench 1 and is equipped with ferrites—for example the mobile phone 5 (FIG. 1)—the communication zones a2, b2 and c2 enlarge. As illustrated in FIG. 2b, the charging zones a1, a2 and a3 are then almost completely covered by the communication zone 20 thus formed.

More precisely, the ferrites 7 increase the coupling between the secondary device 5 and the coils of the charging bench 1. Thus they preferably redirect the magnetic lines containing the data emitted by the second device 5 toward the charging bench 1. Advantageously, the invention employs the formation of such a zone 20 to produce flux for communication between the second device 5 and any coil in the charging bench 1, in particular at least one of the coils other than the charging coil.

Figure 3A:
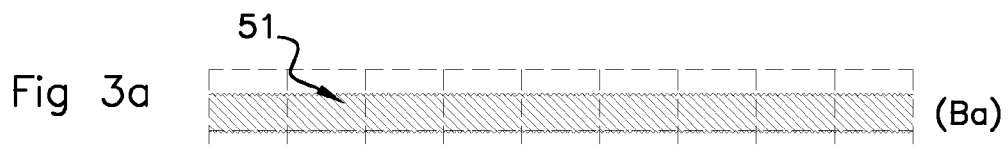
FIGS. 3a to 3c, signal amplitude graphs showing the modulation index of the communication received by the two end coils of the bench according to FIG. 2, in the absence of a device to be charged and when the device to be charged is in two different positions.

The increase in extent of the communication zone results in the increase in the modulation index produced by the charging bench 1 when a communication flux is transmitted to said charging bench 1. The graphs in FIGS. 3a to 3c illustrate the amplitude of this modulation index of signals for the end coils Ba and Bc in the absence of a secondary device 5 or when the secondary device 5 is in various positions, the central coil Bb remaining, in each and every case of this example, the coil emitting the charging flux.

When no secondary device 5 is placed on the charging bench 1 (FIG. 3a) no communication flux is received and the reception signals 51 and 52 of the coils Ba and Bc vary very little: their small amplitude, equal to about 500 mV, is almost noise.

In the case where a secondary device 5 to be charged is placed on the charging bench 1 on the side of one of the end coils, on the side of the coil Ba in the example (FIG. 3b), a high-amplitude communication signal 61 is carried by the reception signal 51 of the coil Ba. The coil Bc does not receive a communication signal. The carrier reception signals 51 and 52 are amplified, relative to the case previously, when the secondary device 5 is equipped with ferrites 7, as in the present case. Thus, the amplitude of the carrier signal 51 is about 1.7 V and that of the carrier signal 52 about 1 V. The amplitude of the signal 51 received by the coil Ba is higher than that of the signal 52 of the coil Bc because the secondary device 5 is nearer the coil Ba than the coil Bc.

Figure 3B:
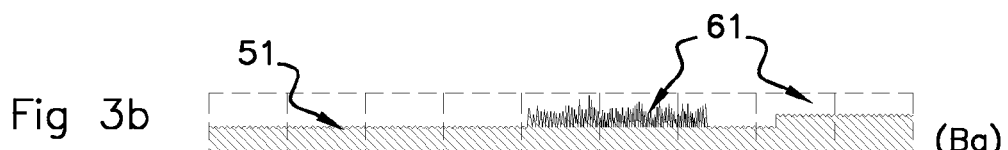
Figure 3C:
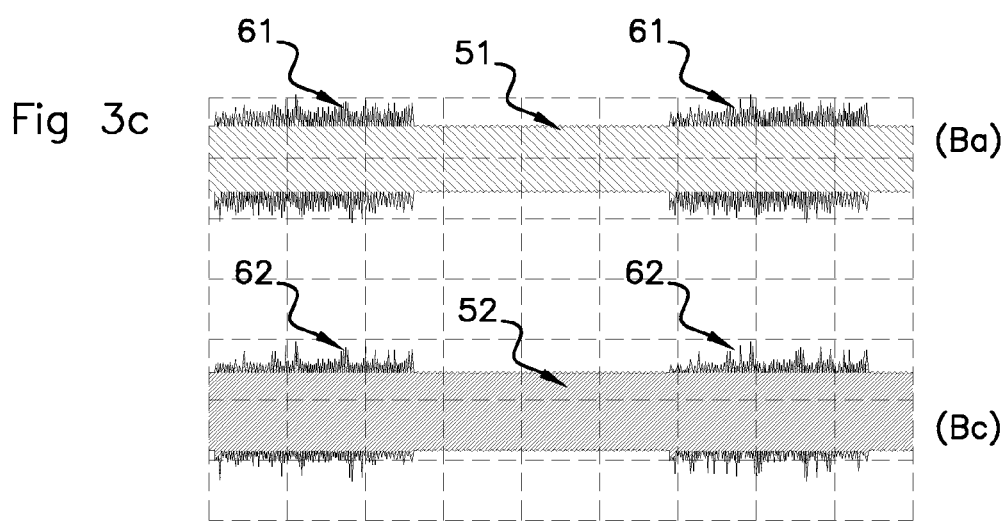

The amplitude of the reception signal 51 of the coil Ba increases by about 250% due to the concentration of flux when the secondary device 5 comprises ferrites 7, as in the example illustrated in FIG. 3b. Moreover, and essentially, because the charging flux and the flux carrying communication frames are decoupled over two different coils, the modulation index then reaches about 25%, which corresponds to a signal-to-noise ratio (signal 61 to noise 51) of about 300 to 400%: decoding of the communication frames can therefore be achieved without ambiguity. Advantageously, the modulation index is such that there is no need for prior calibration.

When the secondary device 5 is placed substantially in the center of the charging bench 1, in other words nearer the central coil Bb than the other end coils, these two end coils Ba and Bc receive communication signals, 61 and 62 respectively, of the same order of magnitude (cf. FIG. 3c). In this case, the modulation index and the certainty in the decoding of the communication frames are optimized for the distant position of the secondary device 5 with respect to each communication coil Ba and Bc, thereby inducing maximum decoupling with the charging flux and effective retrieval of the information pulled from the two signals 61 and 62 forming the communication frames. In the example illustrated in FIG. 3c, the unequal amplitude of the carrier signals 51 and 52, 1.5 V and 2.3 V, respectively, shows that the secondary device 5 is nearer the coil Bc that the coil Ba.

Under these conditions, it would appear that a comparison between the amplitudes of the carrier signals 51 and 52, and/or between the communication signals 61 and 62, would provide an estimation of the location of the secondary device 5 between the end coils Ba and Bc. The invention thus allows a secondary device 5 to be located after it has been detected via amplification of the carrier signals 51 and 52. The diagram of FIG. 4 more particularly illustrates the implementation of these detection and locating steps by a charging bench 1 comprising a number of coils B1, B2, B3, B4, B5, . . . , Bn, arranged in a line. The selective communication phase between the coils may then take place after the secondary device 5 has been located, as explained below.

The partial overlap of the coils B1, B2, B3, . . . , Bn, arranged in two parallel planes, is desirable for reasons of decoupling, as mentioned above. During the detection phase, regularly distributed coils, one coil in three in the example illustrated, namely coils B2 and B5 in FIG. 4, emit a series or brief pulses 80. The amplitude of the signals received in return is measured and compared to a reference threshold K0.Vi, Vi being the initial voltage across each coil and K0 a modulation coefficient.

When a coil, the coil B3 in the example illustrated, receives a signal 83 with an amplitude higher than said threshold, a secondary device 5 to be charged is detected. If a number of coils, for example B3 and B4, receive signals 83 and 84 with an amplitude higher than said threshold, comparison of these amplitudes allows the location of the secondary device 5 to be charged to be deduced directly. In the example, the amplitude of the signal 83 is higher than that of the signal 84, and the secondary device 5 is nearer the coil B3 than the coil B4.

Figure 5:
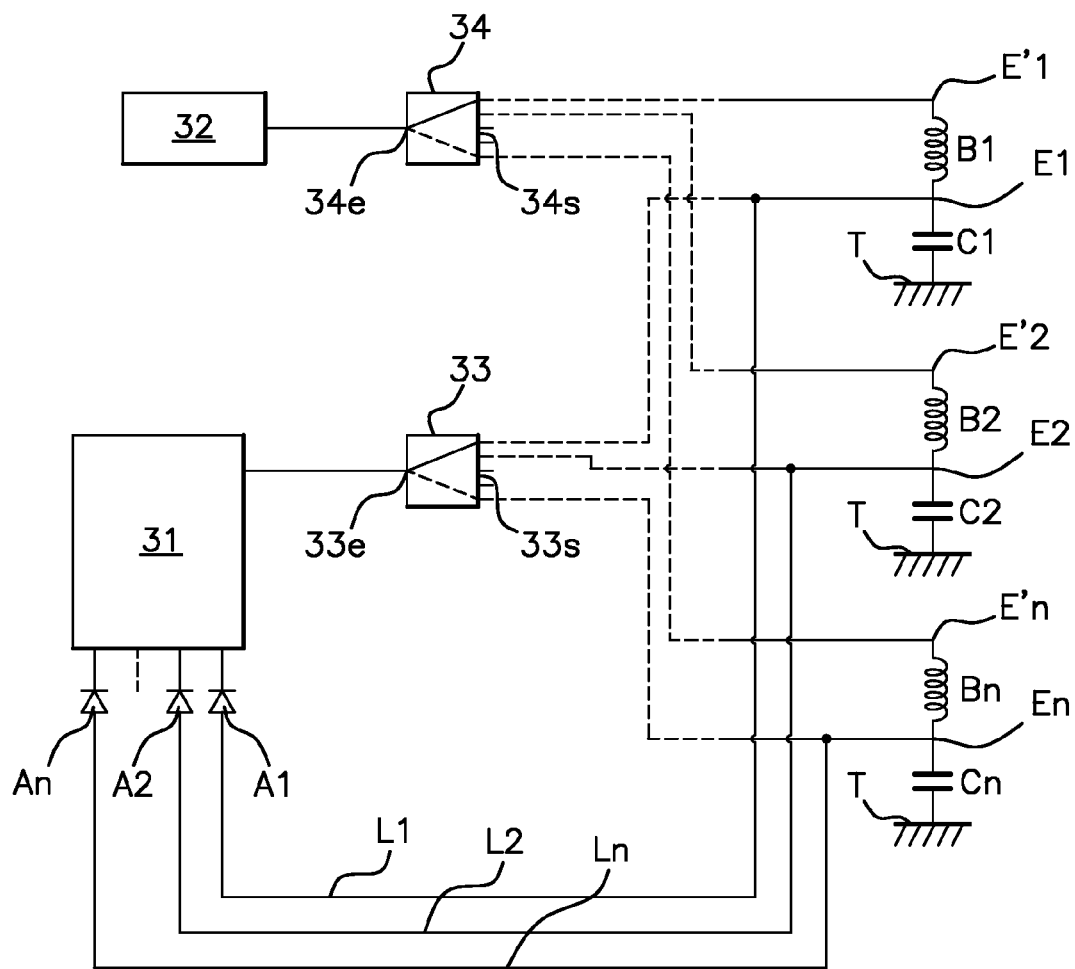
FIG. 5, an example of a communication/charging mode selector circuit for a coil of a charging appliance.

The coil B3 located nearest the secondary device 5 is then switched to charging mode, and the neighboring coil B4 is then switched to communication mode. Switching between modes is carried out by communication/charging mode selector circuits, as described below with reference to the diagram of FIG. 5.

Such a circuit 30 comprises a microcontroller 31 for processing information data originating from at least one secondary device 5; a charging regulator 32; a multipath communication selector 33 the multiple outputs 33s of which are connected to one end E1, E2, . . . , En, of each coil B1, . . . , Bn, and the input 33e of which is connected to the microcontroller 31; and a multipath charging selector 34 the multiple outputs 34s of which are connected to the other end E'1, E'2, . . . , E'n, of each coil B1, . . . , Bn and the input 34e of which is connected to the charging regulator 32. The ends E1, E2, . . . , En of the coils are also connected to the microcontroller 31 via amplifiers A1, A2, . . . , An fitted on direct connections L1, L2, . . . , Ln. These ends E1, E2, . . . , En, are also grounded "T" through capacitors C1, C2, . . . , Cn. These amplifiers and capacitors contribute to balanced operation of the circuit 30.

Each coil is able to function in a mode for communicating information data originating from the secondary device 5 to be charged, by way of connection to the microcontroller 31 via the selector 33, or in a mode for inductive charging via transmission of an energy flux, by way of connection to the regulator 32 via the selector 34.

Figure 6:
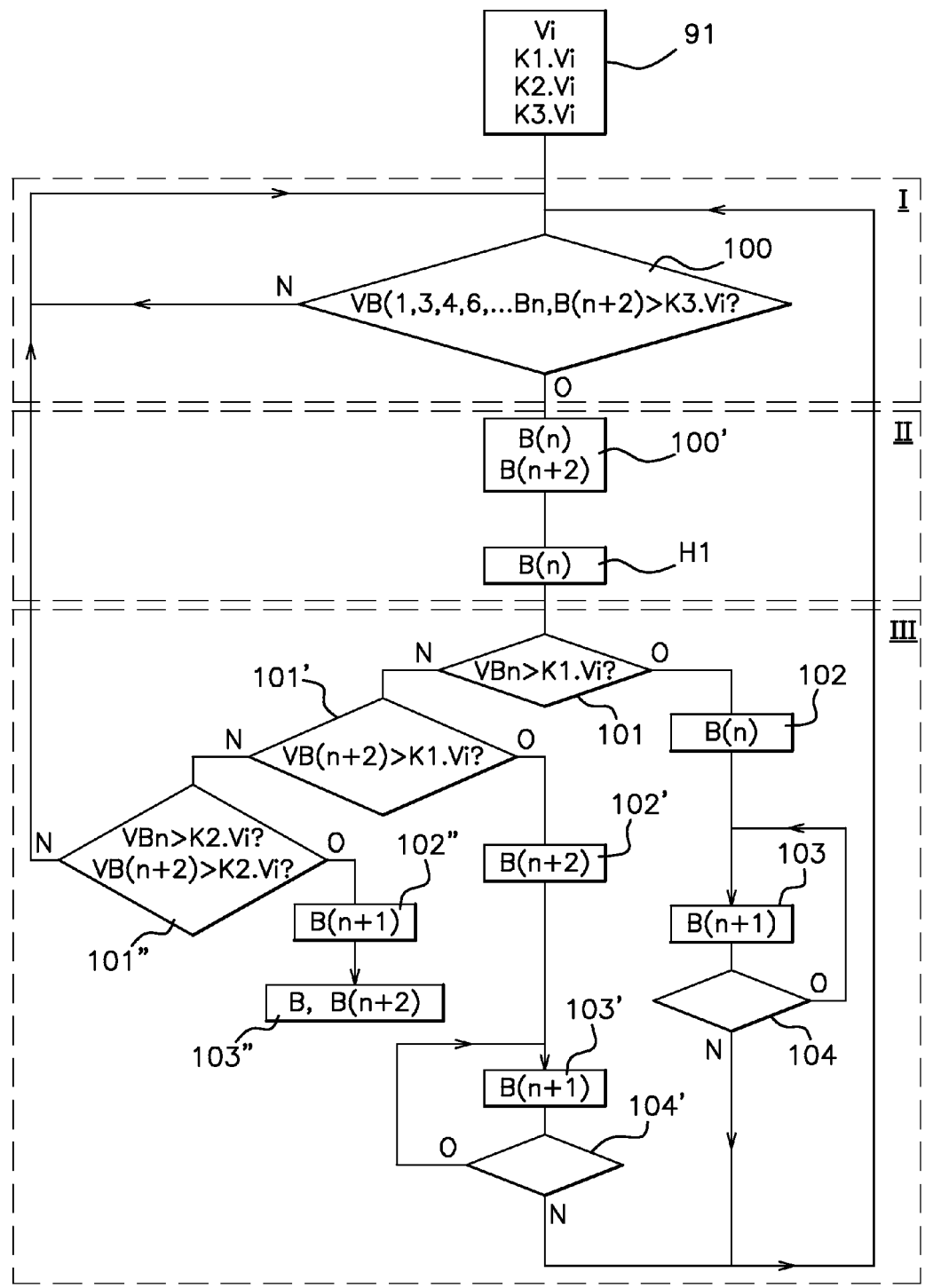
FIG. 6, an exemplary flow chart of steps for selecting charging and communication coils depending on detection thresholds, for a portable device on a charging appliance according to the invention comprising a charging bench according to FIG. 4.

The flow chart of FIG. 6 illustrates a nonlimiting example of steps for selecting charging and communication coils depending on a number of detection/location thresholds for at least one secondary device 5, when the charging bench 1 comprising multiple coils is equipped, according to the invention, with the above selecting circuit.

The microcontroller 31 (FIG. 5) contains memory and comparison means (not shown). A set 91 of detection thresholds for return signals at various levels is stored in the memory, functions of a modulation of the initial voltage Vi of each coil by various coefficients K1, K2, K3: a significant threshold K3.Vi, under which no detection is possible, and a lower detection threshold K2.Vi and an upper detection threshold K1.Vi, defining a range of detection for the secondary device 5. The microcontroller 31 (FIG. 5) compares the voltage levels VB1, VB2, . . . , VB(n+2) of the coils B1, B2, . . . , B(n+2) to said thresholds during a detection phase (phase I). During this step 100, pulses are emitted by certain coils, for example by the coils B2, B5, . . . , and B(n+1) and signals are received, in return, from the secondary device 5 according to the protocol described with regard to FIG. 4.

In the detection step 100, the voltages VB1, VB3, VB4, VB6, . . . , VBn and VB(n+2) are compared to the detection threshold K3.Vi. In the example, the voltages of the coils Bn and B(n+2) are higher than the threshold K3.Vi (result 100'), thereby indicating that a secondary device 5 is detected opposite these coils. In practice, depending on the size of the secondary devices 5 to be charged and of the network of coils, the number of coils concerned per secondary device 5 detected is in general limited to two or three juxtaposed coils. If no voltage VB3, VB4, VB6, . . . , VBn and VB(n+2) is higher than the threshold K3.Vi, the detection step 100 is reinitialized.

In phase (II) of locating the secondary device 5 to be charged, comparison of the levels of the signals received, measured as voltages VBn and VB(n+2), with the detection thresholds K1.Vi and K2.Vi, allows the device 5 to be charged to be located relative to the coils Bn, B(n+1) and B(n+2) and then (phase III) operating modes to be selected, i.e. either the charging mode or the communication mode, for at least two of these coils.

To do this, it is hypothesized that the device 5 is located nearest the coil Bn via its voltage level (step "H1"). To verify this hypothesis, the voltage VBn is compared to the upper threshold K1.Vi in the comparison step 101. If the voltage VBn is higher than the upper limit K1.Vi, it means that the secondary device 5 is closer to the coil Bn than any other coil: the coil Bn is switched into secondary device 5 charging mode (step 102). Furthermore, the coil B(n+1), which is closer to the secondary device 5 than the coil B(n+2) because it is closer to the coil Bn, is switched into communication mode (step 103). If the communication flux is not received by the coil Bn (step 104), the step of comparison to the significant threshold K3.Vi (step 100) is reinitialized.

If the voltage VBn is lower than the upper threshold K1.Vi, the same comparison with the threshold K1.Vi is then carried out for the voltage B(n+2) (step 101'). In the case where the voltage VB(n+2) is higher than the threshold K1.Vi, it is deduced therefrom that the secondary device 5 to be charged is closer to the coil B(n+2) than the other coils: the coil B(n+2) is switched into charging mode (step 102') and the coil B(n+1)—closer to the secondary device 5 to be charged than the coil Bn because it is closer to the coil B(n+2)—is switched into communication mode (step 103'). If the communication flux is not received by the coil B(n+1) (step 104'), the step of comparison to the significant threshold K3.Vi (step 100) is reinitialized.

In the contrary case where the voltage VB(n+2) is lower than the threshold K1.Vi, a double comparison is carried out (step 101") with the lower detection threshold K2.Vi, in order to determine whether one of the voltages VB(n+2) or VBn is higher than the threshold K2.Vi. In the case where one of the voltages VB(n+2) or VBn is higher than the threshold K2.Vi, whereas the other is not, the coil B(n+1) is considered to be closer to the secondary device 5 to be charged and is switched into charging mode (step 102"). One of the adjacent coils or both, Bn and/or B(n+2) is or are switched into communication mode (step 103").

The invention is not limited to the embodiments described and shown. Thus:

- communication between the secondary device 5 to be charged and the charging bench 1 (or primary device 1) may be ensured by another charging bench 1 or by two other charging benches 1;
- the coils may be placed in a two-dimensional array parallel to the upper face of the charging bench 1;
- the coils may be controlled by a control unit other than a microcontroller: a digital processing unit such as a processor, an analog control unit coupled to an analog/digital converter, etc;
- the invention allows any type of mobile device to be charged, for example: mobile phones, any type of smartphone, MP3 players, USB keys, GPSs, efficiently while enabling optimized communication between these devices and the charging bench;
- the charging may be carried out via coupling that is not inductive coupling, for example via microwaves, or via a "witricity" system (system comprising magnetic loop antennas tuned to the same frequency).

The invention claimed is:

1. A method for charging via magnetic coupling performing functions of electrical charging of a portable electronic device, called a secondary device, by a charging device or bench, called a primary device, comprising at least two coils, the at least two coils being electrically out of phase, and of communicating information originating from the secondary device to the primary device, comprising:
    detecting the secondary device then located via the emission of a test signal by at least one coil of the primary device, and receiving, in return, of a signal carrying information data by at least one coil;
    comparing an amplitude of the signal or signals received to at least one reference threshold;
    in a selection phase, selecting the coil of the primary device closest to the secondary device and then switching, by way of mode selecting means, into a mode for charging via transmission of an energy flux; and
    in the selection phase, selecting the coil of the primary device located proximate this charging coil and then switching, by way of mode selecting means, into a mode for communicating information data so as to actuate instructions contained in these data,
each coil being able to function in a mode for communicating information data or in a mode for charging via transmission of an energy flux.

2. The charging method as claimed in claim 1, wherein the energy transmission is achieved via inductive coupling between the at least two coils of the primary device and at least one coil of the secondary device under magnetic resonance conditions.

3. The charging method as claimed in claim 1, in which the test signal consists of a series of brief pulses emitted by a smaller number of coils regularly distributed in the array of coils of the primary device.

4. The detection method as claimed in claim 1, in which a test signal is emitted at regular intervals during charging in order to verify the amplitude of the return signal received by the coils, and to switch the operating modes of the coils depending on a new location of the secondary device when the amplitude of the signal received by the charging coil is compared to the reference threshold.

5. The detection method as claimed in claim 1, in which, when a plurality of secondary devices to be charged are present, the operations of detection, location, and charge/communication selection are carried out for each secondary device.

6. A charging bench able to implement the method as claimed in claim 1, comprising:
    means for supplying electrical power,
    a surface for holding secondary devices to be charged,
    an array of coils consisting of at least two coils, the at least two coils being electrically out of phase
    at least one microcontroller for processing information data originating from at least one secondary device,
    at least one charging regulator, and
    the mode selecting means connected, for each coil, to the microcontroller and the regulator in a circuit, said mode selecting means being a multipath communication selector, the output of which is connected to one end of each coil and the input of which is connected to the microcontroller in order to provide information data, and in a multipath charging selector, the output of which is connected to the other end of each coil and the input of which is connected to the charging regulator in order to enable emission of a flux of electrical energy.

7. The charging bench as claimed in claim 6, in which the coils are at least three in number and arranged in at least two superposed planes that partially overlap one another.

8. The charging bench as claimed in claim 6, in which the coils are mounted in an arrangement chosen from an arrangement in a line or network, especially a matrix, or spiral or circle.

9. The charging bench as claimed in claim 7, in which the coils are mounted in an arrangement chosen from an arrangement in a line or network, especially a matrix, or spiral or circle.

10. A method for charging via magnetic coupling performing functions of electrical charging of a portable electronic device, called a secondary device, by a charging device or bench, called a primary device, comprising at least two coils, the at least two coils being electrically out of phase, and of communicating information originating from the secondary device to the primary device, comprising:
    detecting the secondary device then located via the emission of a test signal by at least one coil of the primary device, and receiving, in return, of a signal carrying information data by at least one coil;
    comparing an amplitude of the signal or signals received to at least one reference threshold;
    in a selection phase, selecting the coil of the primary device closest to the secondary device and then switching, by way of a mode selector, into a mode for charging via transmission of an energy flux; and
    in the selection phase, selecting the coil of the primary device located proximate this charging coil and then switching, by the mode selector, into a mode for communicating information data so as to actuate instructions contained in these data,
    each coil being able to function in a mode for communicating information data or in a mode for charging via transmission of an energy flux.

11. The charging method as claimed in claim 10, wherein the energy transmission is achieved via inductive coupling between the at least two coils of the primary device and at least one coil of the secondary device under magnetic resonance conditions.

12. The charging method as claimed in claim 10, in which the test signal consists of a series of brief pulses emitted by a smaller number of coils regularly distributed in the array of coils of the primary device.

13. The detection method as claimed in claim 10, in which a test signal is emitted at regular intervals during charging in order to verify the amplitude of the return signal received by the coils, and to switch the operating modes of the coils depending on a new location of the secondary device when the amplitude of the signal received by the charging coil is compared to the reference threshold.

14. The detection method as claimed in claim 10, in which, when a plurality of secondary devices to be charged are present, the operations of detection, location, and charge/communication selection are carried out for each secondary device.

15. A charging bench able to implement the method as claimed in claim 10, comprising:
    an electrical power supply,
    a surface for holding secondary devices to be charged,
    an array of coils consisting of the at least two coils, the at least two coils being electrically out of phase
    at least one microcontroller for processing information data originating from at least one secondary device,
    at least one charging regulator, and
    the mode selector connected, for each coil, to the microcontroller and the regulator in a circuit, said mode selector being a multipath communication selector, the output of which is connected to one end of each coil and the input of which is connected to the microcontroller in order to provide information data, and a multipath charging selector, the output of which is connected to the other end of each coil and the input of which is connected to the charging regulator in order to enable emission of a flux of electrical energy.

16. The charging bench as claimed in claim 15, in which the coils are at least three in number and arranged in at least two superposed planes that partially overlap one another.

17. The charging bench as claimed in claim 15, in which the coils are mounted in an arrangement chosen from an arrangement in a line or network, especially a matrix, or spiral or circle.

18. The charging bench as claimed in claim 16, in which the coils are mounted in an arrangement chosen from an arrangement in a line or network, especially a matrix, or spiral or circle.

* * * * *